(12) United States Patent
Jayanti et al.

(10) Patent No.: US 10,093,039 B2
(45) Date of Patent: Oct. 9, 2018

(54) THREE-DIMENSIONAL PARTS HAVING INTERCONNECTED HOLLOW PATTERNS, METHOD OF MANUFACTURING AND METHOD OF PRODUCING COMPOSITE PART

(71) Applicant: Stratasys, Inc., Eden Prairie, MN (US)

(72) Inventors: Subramaniam Jayanti, Eden Prairie, MN (US); Erik K. Heide, Eden Prairie, MN (US); Donald J. Holzwarth, Minnetonka, MN (US); Thomas James Studanski, Plymouth, MN (US); Alissa Ann Wild, Chaska, MN (US); Kevin C. Johnson, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 239 days.

(21) Appl. No.: 15/159,448

(22) Filed: May 19, 2016

(65) Prior Publication Data

US 2016/0257033 A1  Sep. 8, 2016

Related U.S. Application Data

(63) Continuation-in-part of application No. 13/790,849, filed on Mar. 8, 2013, now Pat. No. 9,399,320.

(51) Int. Cl.
*B32B 3/12* (2006.01)
*B29C 33/52* (2006.01)
(Continued)

(52) U.S. Cl.
CPC .......... *B29C 33/52* (2013.01); *B29C 33/3842* (2013.01); *B29C 33/40* (2013.01); *B29C 64/112* (2017.08); *B29C 64/40* (2017.08); *B29C 70/30* (2013.01); *B33Y 10/00* (2014.12); *B33Y 80/00* (2014.12); *B29K 2105/0872* (2013.01); *B29K 2307/04* (2013.01); *B29K 2833/08* (2013.01);
(Continued)

(58) Field of Classification Search
CPC ................................................ Y10T 428/1234
See application file for complete search history.

(56) References Cited

U.S. PATENT DOCUMENTS 5,121,329 A 6/1992 Crump
5,169,081 A 12/1992 Goedderz
(Continued)

*Primary Examiner* — Adam Krupicka
(74) *Attorney, Agent, or Firm* — Peter J. Ims; Westman, Champlin & Koehler, P.A.

(57) ABSTRACT

A three-dimensional part is printed using an additive manufacturing technique. The three-dimensional part includes an outer wall having an outer surface defining a shape of a part and in interior surface defining an interior cavity. The part includes a plurality of first sections having a plurality of printed layers, each printed layer of the first section having a plurality of wall segments that form triangle shaped cells wherein each of the plurality of first sections are attached to the interior surface of the outer wall. The part includes a plurality of second sections having a plurality of printed layers, each printed layer of the second section having a plurality of wall segments that form hexagram shaped cells of hexagons and triangles, wherein each of the plurality of second printed sections are attached to the interior surface of the outer wall and wherein the first and second sections are in an alternating pattern, wherein when adjacent printed layers of the first and second sections are printed a wall segment of a cell defining a triangle bisect the hexagon shaped cell.

25 Claims, 9 Drawing Sheets

(51) Int. Cl.
  *B29C 33/38* (2006.01)
  *B29C 33/40* (2006.01)
  *B29C 70/30* (2006.01)
  *B33Y 10/00* (2015.01)
  *B33Y 80/00* (2015.01)
  *B29C 64/112* (2017.01)
  *B29C 64/40* (2017.01)
  *B29K 105/08* (2006.01)
  *B29K 307/04* (2006.01)

(52) U.S. Cl.
  CPC . *B29K 2995/0062* (2013.01); *Y10T 428/1234* (2015.01); *Y10T 428/24149* (2015.01); *Y10T 428/24165* (2015.01)

(56) References Cited

U.S. PATENT DOCUMENTS

| | | |
|---|---|---|
| 5,303,141 A | 4/1994 | Batchelder et al. |
| 5,312,224 A | 5/1994 | Batchelder et al. |
| 5,340,433 A | 8/1994 | Crump |
| 5,503,785 A | 4/1996 | Crump et al. |
| 5,738,817 A | 4/1998 | Danforth et al. |
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 6,004,124 A | 12/1999 | Swanson et al. |
| 6,022,207 A | 2/2000 | Dahlin et al. |
| 6,054,077 A | 4/2000 | Comb et al. |
| 6,067,480 A | 5/2000 | Stuffle et al. |
| 6,070,107 A | 5/2000 | Lombardi et al. |
| 6,085,957 A | 7/2000 | Zinniel et al. |
| 6,129,872 A | 10/2000 | Jang |
| 6,227,340 B1 | 5/2001 | Braford, Jr. |
| 6,228,923 B1 | 5/2001 | Lombardi et al. |
| 6,257,517 B1 | 7/2001 | Babish et al. |
| 6,547,995 B1 | 4/2003 | Comb |
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,127,309 B2 | 10/2006 | Dunn et al. |
| 7,172,715 B2 | 2/2007 | Swanson et al. |
| 7,236,166 B2 | 6/2007 | Zinniel et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 7,938,351 B2 | 5/2011 | Taatjes et al. |
| 7,938,356 B2 | 5/2011 | Taatjes et al. |
| 7,951,324 B2 | 5/2011 | Naruse et al. |
| 8,033,811 B2 | 10/2011 | Swanson et al. |
| 8,153,182 B2 | 4/2012 | Comb et al. |
| 8,221,669 B2 | 7/2012 | Batchelder et al. |
| 2002/0141912 A1 | 10/2002 | Murrell et al. |
| 2005/0129941 A1 | 6/2005 | Comb et al. |
| 2007/0003656 A1 | 1/2007 | LaBossiere et al. |
| 2007/0228590 A1 | 10/2007 | LaBossiere et al. |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0233604 A1 | 9/2011 | Batchelder et al. |
| 2012/0067501 A1 | 3/2012 | Lyons |
| 2012/0068378 A1 | 3/2012 | Swanson et al. |
| 2012/0070523 A1 | 3/2012 | Swanson et al. |
| 2012/0162314 A1 | 6/2012 | Swanson et al. |
| 2012/0164256 A1 | 6/2012 | Swanson et al. |
| 2013/0078073 A1 | 3/2013 | Comb et al. |

THREE-DIMENSIONAL PARTS HAVING INTERCONNECTED HOLLOW PATTERNS, METHOD OF MANUFACTURING AND METHOD OF PRODUCING COMPOSITE PART

CROSS REFERENCE TO RELATED APPLICATION

The present application is a continuation-in-part of U.S. patent application Ser. No. 13/790,849 entitled THREE DIMENSIONAL PARTS HAVING INTERCONNECTED HOLLOW PATTERNS, AND METHOD FOR GENERATING AND PRINTING THEREOF that was filed on Mar. 8, 2013, the contents of which is incorporated by reference in its entirety.

BACKGROUND

The present disclosure relates to additive manufacturing systems for printing or otherwise building three-dimensional (3D) parts with layer-based, additive manufacturing techniques. In particular, the present disclosure relates to 3D parts having hollow geometries, and to methods for generating and printing such 3D parts.

Additive manufacturing is generally a process in which a three-dimensional (3D) object is manufactured utilizing a computer model of the objects. The basic operation of an additive manufacturing system consists of slicing a three-dimensional computer model into thin cross sections, translating the result into two-dimensional position data, and feeding the data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In an ink jet process, a building material is jetted in droplets from a dispensing head having a set of nozzles to deposit layers on a supporting structure. Depending on the fabrication technique and material type, the layers may then be planarized, cured and/or solidified using a suitable device. The building material may include part material, which forms the object, and support material, which supports the object as it is being built.

In a fused deposition modeling additive manufacturing system, a 3D part or model may be printed from a digital representation of the 3D part in a layer-by-layer manner by extruding a flowable part material along toolpaths. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation. Support material is then deposited from a second nozzle pursuant to the generated geometry during the printing process to build a support structure.

In an electrophotographic 3D printing process, each slice of the digital representation of the 3D part and its support structure is printed or developed using an electrophotographic engine. The electrophotographic engine generally operates in accordance with 2D electrophotographic printing processes, using charged powder materials that are formulated for use in building a 3D part (e.g., a polymeric toner material). The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and/or pressure to build the 3D part.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. A host computer generates additional geometry acting as a support structure for the overhanging or free-space segments of the 3D part being formed. The support material adheres to the modeling material during fabrication, and is removable from the completed 3D part when the printing process is complete.

SUMMARY

An aspect of the present disclosure is directed to a three-dimensional part is printed using an additive manufacturing technique. The three-dimensional part includes an outer wall having an outer surface defining a shape of a part and an interior surface defining an interior cavity. The part includes a plurality of first sections having a plurality of wall segments that form triangle shaped cells wherein each of the plurality of first sections are attached to the interior surface of the outer wall. The part includes a plurality of second sections having a plurality of wall segments that form hexagram shaped cells of hexagons and triangles, wherein each of the plurality of second sections are attached to the interior surface of the outer wall and wherein each of the first and second sections comprise a plurality of printed layers, wherein the plurality of first and second sections are in an alternating pattern and wherein when adjacent printed layers of the first and second sections are printed, a wall segment of a cell defining a triangle bisect the hexagon shaped cell.

Another aspect of the present disclosure is directed to a method of additive manufacturing a sacrificial tooling part having an interconnected hollow triangular pattern. The method includes printing an outer wall portion having an outer surface and an inner surface. The method includes printing a first set of triangular shaped cell layers using an additive manufacturing technique, wherein the triangle cells are formed by segments, wherein each segment extends in a substantially straight line between two points on the inner surface. The method further includes printing a second set of hexagram shaped cell layers over the first set of triangular shaped cell layers using the additive manufacturing technique, wherein the hexagram cell layers comprise hexagon cells having common triangle cells, wherein the hexagram cells are formed by segments, wherein each segment extends in a substantially straight line between two points on the inner surface. When the first and second layers are printed on top of each other, the triangle shaped cells interconnect with the hexagram shaped cells.

Another aspect of the present disclosure is directed to a method of manufacturing a sacrificial tooling part in a layer by layer manner utilizing an additive manufacturing device, the sacrificial tooling part configured to use in making a composite part. The method includes printing a outer wall portion having an outer surface and an inner surface wherein the outer wall surface defines a shape of the composite part. A first set of triangular shaped cell layers is printed using an additive manufacturing technique with a water soluble or disintegrable material, wherein the triangle cells are formed by segments that extend in a substantially straight line between two points on the inner surface. The method includes printing a second set of hexagram shaped cell layers over the first set of triangular shaped cell layers using the additive manufacturing technique with a water soluble or disintegrable material, wherein the hexagram cells comprise hexagon cells that have common triangle cells, wherein the hexagram cells are formed by segments that extend in a substantially straight line between two points on the inner surface wherein when the first and second are printed on top of each other, the triangle shaped cells interconnect with the hexagram shaped cells. The method includes repeating the printing of the first and second cell layers until the part is built where the next printed layers are rotated an angle relative to the previously printed layers. After the part is built one or more layers of composite material is placed over the outer surface of the outer wall portion after the part is built. The composite material is cured at elevated temperatures and pressures to produce the composite part. The cured composite part is then submerged in an aqueous solution to remove the printed part from the cured composite part.

Another aspect of the present disclosure is directed to a computer program product comprising non-transitory computer-executable code embodied in a non-transitory computer medium. When the computer program product is executed on one or more computing devices, the device performs a first step of generating toolpath instructions for building a three-dimensional part with an additive manufacturing device. The toolpath instructions are used to fabricate at least a portion of the sacrificial tooling using two or more build patterns deposited one on top of the other to sparsely fill an interior space. The instructions cause a material to printed to sparsely fill an interior region of one or more layers of a perimeter of the sacrificial tooling part with a set of layers of the first pattern comprising a plurality of triangular cells, where walls forming the triangular cells are formed by substantially straight lines having ends that attach to the inner surface. The instructions cause further printing of the material on top of the layers of the first pattern to sparsely fill the interior region of one or more next layers of the perimeter of the sacrificial tooling part with a set of layers of the second pattern comprising a plurality of hexagram cells having commonly shared triangular cells, wherein walls forming the hexagram cells are formed by substantially straight lines having ends that attach to an inner surface of the second layer of the perimeter. The instructions cause repeated printing of the sets of layers of the first and second pattern within the perimeter of the sacrificial tooling part wherein each printed layer set is rotated at an angle relative to the previously printed layer set.

DEFINITIONS

Unless otherwise specified, the following terms as used herein have the meanings provided below:

The terms "three-dimensional part" and "3D part" refer to 3D objects printed using an additive manufacturing technique, and may refer to parts printed from part or modeling materials, as well as support structures printed from support materials.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The term "porosity" refers to the volume fraction of air or void within a given 3D part volume.

The term "permeability" refers to the connectedness of air voids within a 3D part which allow for fluid flow along different directions in all three axes.

The term "toolpath" refers to a path of extrusion as applied to Fused Deposition Modeling.

The term "strength" refers to the maximum force per unit area that the printed 3D structure can sustain before significant structural failure occurs.

The term "stiffness" refers to the ability of the printed 3D part to resist deformation under the influence of an externally applied force.

The term "wetting surface area" refers to the amount of surface area within a 3D part that can be exposed to fluid per unit volume.

The term "uniaxial compression" refers to a test or loading condition where a material is compressed along a single axis, while the other 2 orthogonal directions are not. In the context of testing, a uniform rate of displacement is applied to the specimen, while the resisting force is measured via a piezo-electric sensor. If referred to as "constrained uniaxial compression", the one or two orthogonal directions may be restrained to prevent external deformation during the test.

The term "triaxial compression" refers to a test or loading condition where a material/structure is compressed simultaneously in all three axial directions.

The term "wall segment" refers to a portion of a printed bead or road that defines a side of one or more cells of a printed layer.

The term "section" refers to one or more aligned printed layers of a single configuration having a selected thickness.

The terms "about" and "substantially" are used herein with respect to measurable values and ranges due to expected variations known to those skilled in the art (e.g., limitations and variabilities in measurements).

DETAILED DESCRIPTION

Figure 1:
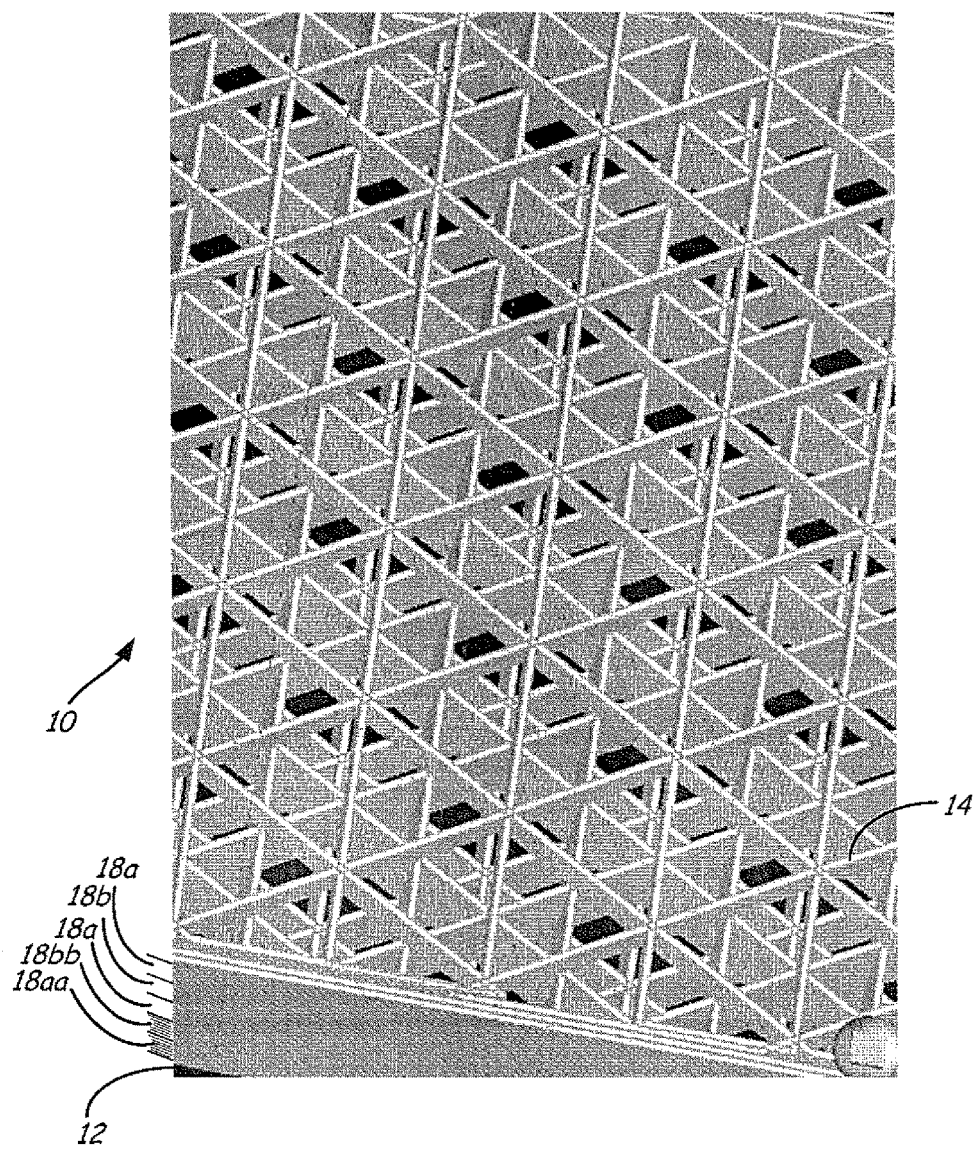
FIG. 1 is an isometric view of a 3D part of the present disclosure having an interconnected hollow pattern triangle and hexagram shaped geometries in alternating layers having 32 printed layers.

The present disclosure is directed to a printed 3D part having internal, interconnected cells that have high porosity, permeability and wetting surface area and the method of printing the 3D part. The cells provide sufficient strength and stiffness to the 3D part to withstand further processing conditions, such as but not limited to curing a carbon fiber composite which requires elevated temperatures and pressures that are similar to that of a triaxial compression test. Typical process conditions for curing carbon fiber composites include pressures up to about 100 psig and temperatures up to about 230° F. to about 250° F.

Printing a 3D part for use as a sacrificial tooling part for manufacturing composite parts, such as carbon fiber composite parts, is advantageous over prior molding processes. Printed 3D parts can be produced more cost efficiently and more quickly than typical molds, which can require long lead times to design and build tooling, that can only be used once. Further, when forming
composite parts having complex configurations, the tooling becomes more complex and expensive. Building complex configurations with additive manufacturing techniques does not result in significantly more expense relative to less complex parts.

In one method of manufacturing a composite part, a 3D part is printed in a layer by layer manner where the 3D part has an outer surface that defines a shape of the composite part. An internal structure of the 3D part includes layers with interconnected open cells that provide sufficient strength and stiffness to the outer surface to prevent deformation under elevated pressures required to cure the composite, while having high porosity, permeability and wetting surface area. The material utilized to print the 3D part has a sufficiently high glass transition temperature to prevent deformation of the 3D part at elevated temperatures, such as temperatures required to cure a composite part.

In some instances the 3D part is a sacrificial tooling part for molding a composite part where one or more pliable sheet of a composite is formed around the printed 3D part and subsequently cured at elevated temperatures and pressures to produce the rigid composite part. However, removal of the mold in one piece without damaging the rigid composite part can be difficult, if not impossible, due to the configuration of the composite part. For instance, a tank can have a small inlet and a small outlet and a large body. Therefore, the mold with a larger cross-sectional area than that of the inlet or outlet cannot be removed intact. Further, a sacrificial tooling part for a pipe or manifold with curved portions can only be used a single time, as it is not possible to remove the sacrificial tooling part from the cured composite part without destroying the sacrificial tooling part.

While the present disclosure describes the printed part being used as a sacrificial tooling part for a composite part, the present disclosure is not limited to printing a part for use as a sacrificial tooling part for a composite part. Rather, the present disclosure can be utilized to print 3D parts for any suitable purpose.

An exemplary 3D part that can be utilized as a sacrificial tooling part for a composite part is a 3D part that is printed with a water soluble polymer or copolymer or a polymer or copolymer that disintegrates or dissolves in an aqueous solution or dispersion. A non-limiting exemplary water soluble or dispersible material that is available under the SR110 trademark and manufactured by Stratasys, Inc. located in Eden Prairie, Minn.

The 3D part is printed with an exterior wall in the form of the selected carbon fiber composite part where the 3D part has the internal interconnected, open cell structure that provides the necessary strength and stiffness to withstand curing pressures while the part material is selected to withstand curing temperatures. One or more composite layers, for example a sheet, roll, or filament of a carbon fiber composite, is then formed around the sacrificial tooling part and the carbon fiber layer(s) and the sacrificial tooling part are then placed into an autoclave to subject the carbon fiber layer(s) and the printed 3D part to curing conditions. Once cured, the carbon fiber composite part and the sacrificial tooling part are placed into an aqueous based solution or dispersion to cause the sacrificial tooling part to disintegrate or dissolve into the aqueous based solution.

However, to dissolve or disintegrate the sacrificial tooling part, the aqueous based solution must be able to contact the material. Therefore, it is desirable to design the interconnected open cell structure to have high porosity, permeability and wetting surface area to increase the dissolution or disintegration rates of the polymer material. A higher the wetting surface area increases the dissolution or disintegration rates relative to a lower wetting surface area. Higher dissolution or disintegration rates are desirable, as prolonged exposure of the composite part to an aqueous solution, including a basic solution, can detrimentally affect the strength of the composite part.

Further, it is advantageous to utilize a minimal amount of material to form the internal interconnected open cell structure, as when less material used to print, the material cost is reduced and less time is required to disintegrate or dissolve the sacrificial tooling part from the composite part. However, a balance is required between the amount of material utilized to print the sacrificial tooling part and the required structural integrity, as too little material in the sacrificial tooling part may result in a structural failure in the curing process while too much material will require longer processing times within the aqueous solution or dispersion and increased costs. Further, when building sparsely filled structures with extrusion based additive manufacturing systems, such as structures with internal interconnected cells with high porosity, consideration must also be made to prevent sagging of a recently printed road of material along a sacrificial tooling part path due to gravity, as unsupported roads of molten polymeric materials do not bridge well.

While the speed of printing a sacrificial tooling part for a composite part is faster than that of traditional molding processes, the build process for printing the 3D part for the mold can take a significant amount of time. The present disclosure utilizes build patterns for the open celled structure that utilizes long, straight toolpaths. Utilizing long, straight toolpaths allow a print head on an extrusion based additive manufacturing system, such as a fused deposition modeling system available under the Fortus 900mc trademark manufactured Stratasys, Inc. located in Eden Prairie, Minn., to move at faster speeds which results in a shorter build time for the 3D part. Sharp turns in the tool path require the print head to slow to accurately deposit material, which results in slower print times.

As shown in FIG. 1, 3D part 10 is a portion of exemplary printed 3D part of the present disclosure having an interconnected cellular structure with high porosity, permeability and wetting surface area. In the shown embodiment, 3D part 10 is printed with multiple successive layers each extending in a horizontal x-y plane, and are stacked along the z-axis. However, as defined above, x-y-z coordinate system may vary in orientation depending on the layer-printing direction, and may alternatively be based on different coordinate systems (e.g., polar coordinate systems). Further, the print plane can be in a vertical plane and the layers stacked along a horizontal print axis. The print plane can also be non-vertical or non-horizontal with the print axis being substantially perpendicular to the build plane.

In the current example, 3D part 10 has a first or bottom layer 12 and a last or top layer 14, where the printed layers define perimeter wall 16 with a substantially rectangular prism overall geometry. A rectangular prism geometry of the 3D part 10 is non-limiting as the configuration of the part can be of any configuration that can be printed with an additive manufacturing system.

The printed layers of 3D part 10 between and including bottom layer 12 and top layer 14 are grouped into alternating sections 18 (i.e., sections 18a-18b). Section 18a comprises a series of layers 18aa each having a triangular open celled configuration and forming a triangular cell structure, and section 18b comprises a series of layers 18bb each having a hexagram open celled configuration and forming a hexagram cell structure. While two differently configured cell layers 18aa and 18bb are illustrated as forming sections have two different cell structures, the present disclosure can have one cell section configuration or three or more cell section configurations, forming sections having three or more different cell structures, provided the resulting internal structure provides the necessary strength and stiffness, while having high porosity permeability and wetting surface area. Each set of sections 18 may be derived from any desired number of printed layers such as 2-100 layers per set and more typically 4-32 layers per set.

Increasing the number of layers per set of cell layers increases permeability and decreases wetting surface area. Decreasing the number of layers per set of cell layers increases wetting surface area and decreases permeability. Therefore, a balance between permeability and wetting surface area can be considered when determining the number of printed layers per set.

In the shown embodiment, the section 18a and the section 18b have thirty two layers that are printed in an aligned stack. In order to cause the interconnected cell structure to have substantially directional independent strength, the next set of layers 18a and 18b are rotated a selected angle from the previously printed layers. A typical angle of rotation in the build plane is about 60 degrees such that the set of cell layer orientation repeats every six set of cell layers. While a 60 angle or rotation is typical, any angle of rotation, such as from about 50 degrees to about 70 degrees, is within the scope of the present disclosure, provided the resulting 3D part is capable of withstanding the triaxial compression associated with curing a composite part.

Additionally, the hollow pattern of 3D part 10 also allows the hollow regions to remain interconnected even when the overall geometry of 3D part 10 bends around corners. Thus, 3D part 10 may remain porous and permeable regardless of the overall geometry of 3D part 10.

Figure 2:
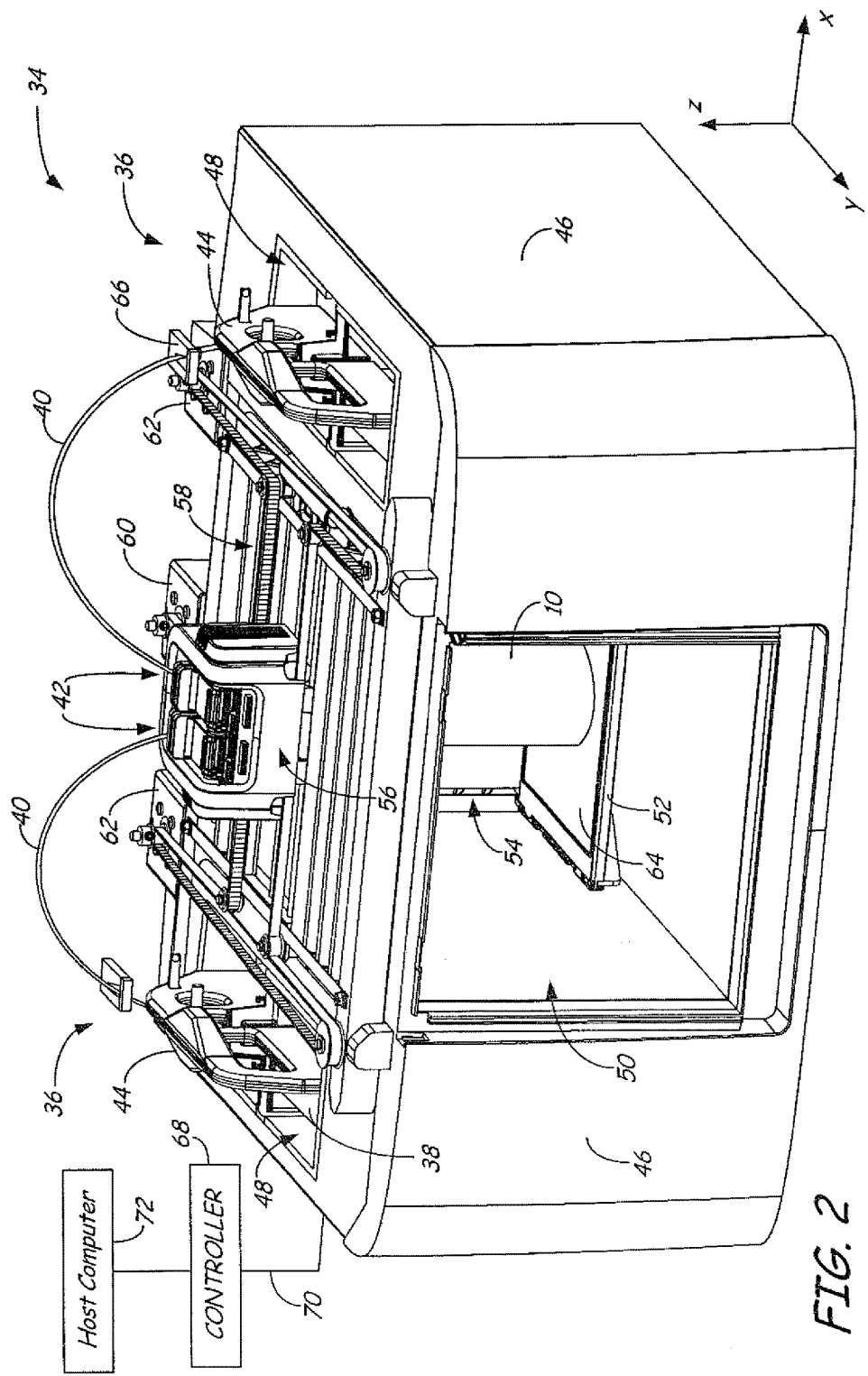
FIG. 2 is a top, front perspective view of an additive manufacturing system in use with consumable assemblies, for printing 3D parts of the present disclosure.

The present disclosure is also directed to a method for generating and printing the 3D parts of the present disclosure (e.g. 3D part 10) with a host computer and an additive manufacturing system. As shown in FIG. 2, system 34 is an exemplary extrusion-based additive manufacturing system for printing the 3D parts of the present disclosure (e.g., 3D part 10) from part and/or support material filaments using a layer-based, additive manufacturing technique. However, in the present disclosure the part is typically more than 50 wt % support material and more typically about 100 wt % support material. Suitable additive manufacturing systems for system 34 include extrusion-based systems developed by Stratasys, Inc., Eden Prairie, Minn. under the "FDM" trademark. However, it is understood that the 3D parts of the present disclosure may be printed using any suitable additive manufacturing technique and related system.

FIG. 2 shows system 34 in use with two consumable assemblies 36. Typically, one of the consumable assemblies 36 contains a part material filament ("part material consumable assembly"), and the other consumable assembly 36 contains a support material filament ("support material consumable assembly"). However, both consumable assemblies 36 may contain the same material.

In the shown embodiment, each consumable assembly 36 includes container portion 38, guide tube 40, print head 42, and handle 44. Container portion 38 may retain a spool or coil of a consumable filament. Guide tube 40 interconnects container portion 38 and print head 42, where a drive mechanism of print head 42 may draws successive segments of the consumable filament from container portion 38 and through guide tube 40.

In this embodiment, guide tube 40 and print head 42 are subcomponents of consumable assembly 36, and may be interchanged to and from system 34 with each consumable assembly 36. In alternative embodiments, guide tube 40 and/or print head 42 may be components of system 34, rather than subcomponents of consumable assemblies 36.

As further shown, system 34 includes system casing 46, two bays 48, chamber 50, platen 52, platen gantry 54, head carriage 56, head gantry 58, z-axis motor 60, and a pair of x-y motors 62. System casing 46 is a structural component of system 34 and may include multiple structural sub-components such as support frames, housing walls, and the like. In the shown embodiment, system casing 46 defines the dimensions of bays 48, and of chamber 50. Bays 48 are container bays configured to respectively receive container portions 38 of consumable assemblies 36. Typically, each of bays 48 may be intended to receive either a part material consumable assembly 36 or a support material consumable assembly 36.

In an alternative embodiment, bays 48 may be omitted to reduce the overall footprint of system 34. In this embodiment, container portions 38 may stand adjacent to system casing 46, while providing sufficient ranges of movement for guide tubes 40 and print heads 42.

Chamber 50 is an enclosed environment that contains platen 52 for printing 3D part 10. Chamber 50 may be heated (e.g., with circulating heated air) to reduce the rate at which the part and support materials solidify after being extruded and deposited (e.g., to reduce distortions and curling). In alternative embodiments, chamber 50 may be omitted and/or replaced with different types of build environments. For example, 3D part 10 may be built in a build environment that is open to ambient conditions or may be enclosed with alternative structures (e.g., flexible curtains).

Platen 52 is a platform on which 3D part 10 is printed in a layer-by-layer manner, and is supported by platen gantry 54. In some embodiments, platen 52 may engage and support a build substrate 64, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 52 or onto the build substrate 64. Platen gantry 54 is a gantry assembly configured to move platen 52 along (or substantially along) the vertical z-axis and is powered by z-axis motor 60.

Head carriage 56 is a unit configured to receive one or more removable print heads, such as print heads 42, and is supported by head gantry 58. In some embodiments, guide tube 40 and/or print head 42 may be components of system 34, rather than subcomponents of consumable assemblies 36. In these embodiments, additional examples of suitable devices for print heads 42, and the connections between print heads 42 and head gantry 58 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. No. 7,896,209; and Comb et al., U.S. Pat. No. 8,153,182.

In the shown embodiment, head gantry 58 is a belt-driven gantry assembly configured to move head carriage 56 (and the retained print heads 42) in (or substantially in) a horizontal x-y plane above chamber 50, and is powered by x-y motors 62. In an alternative embodiment, platen 52 may be configured to move in the horizontal x-y plane within chamber 50, and head carriage 56 (and print heads 42) may be configured to move along the z-axis. Other similar arrangements may also be used such that one or both of platen 52 and print heads 42 are moveable relative to each other. Platen 52 and head carriage 56 (and print heads 42) may also be oriented along different axes. For example, platen 52 may be oriented vertically and print heads 42 may print 3D part 10 along the x-axis or the y-axis.

System 34 also includes controller 68, which is one or more control circuits configured to monitor and operate the components of system 34. For example, one or more of the control functions performed by controller 68 can be implemented in hardware, software, firmware, and the like, or a combination thereof. Controller 68 may communicate over communication line 70 with print heads 42, chamber 50 (e.g., with a heating unit for chamber 50), head carriage 56, motors 60 and 62, sensor assemblies 66, and various sensors, calibration devices, display devices, and/or user input devices. In some embodiments, controller 68 may also communicate with one or more of bays 48, platen 52, platen gantry 54, head gantry 58, and any other suitable component of system 34.

While illustrated as a single signal line, communication line 70 may include one or more electrical, optical, and/or wireless signal lines, allowing controller 68 to communicate with various components of system 34. Furthermore, while illustrated outside of system 34, controller 68 and communication line 70 may be internal components to system 34.

System 34 and/or controller 68 may also communicate with one or more computer-based systems (not shown), such as host computer 72, which may include computer-based hardware, such as data storage devices, processors, memory modules and the like for generating, storing, and transmitting tool path and related printing instructions for 3D part 10 to system 34. Host computer 72 may be internal or external to system 34, and may include suitable hardware (e.g., processor, storage media, memory, user interfaces, and the like) to receive or generate a digital model of 3D part 10, to slice the digital model into the digital layers, generate any required support structures, generate any required tool paths, and transmit the resulting information to system 34 and/or controller 68.

During operation, controller 68 may direct z-axis motor 60 and platen gantry 54 to move platen 52 to a predetermined height within chamber 50. Controller 68 may then direct motors 62 and head gantry 58 to move head carriage 56 (and the retained print heads 42) around in the horizontal x-y plane above chamber 50. Controller 68 may also direct print heads 42 to selectively draw successive segments of the consumable filaments from container portions 38 and through guide tubes 40, respectively.

Each print head 42 preferably includes a liquefier assembly which thermally melts the successive segments of the received consumable filament such that the filament becomes a molten material. The molten material is then extruded and deposited onto platen 52 for printing 3D part 10 in a layer-by-layer manner. 3D part 10 may then undergo one or more additional post-processing steps, if desired.

Figure 3:
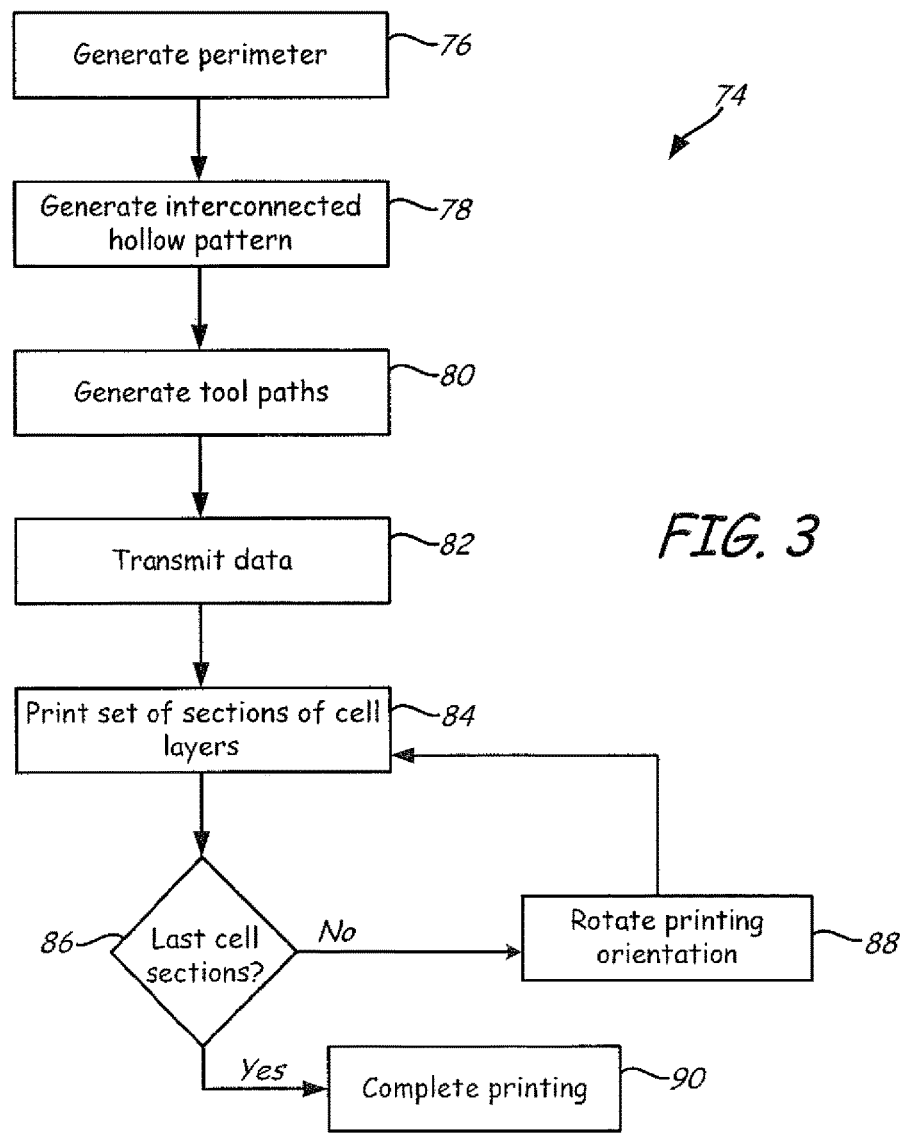
FIG. 3 is a flow diagram of a method for generating and printing 3D parts of the present disclosure.

FIG. 3 is a flow diagram of method 74 for printing 3D parts of the present disclosure with additive manufacturing systems. The following discussion of method 74 is made with reference to 3D part 10 and system 34 with the understanding that method 74 may also be used to print 3D parts of the present disclosure having a variety of geometries, and with any suitable additive manufacturing technique and system.

As shown in FIG. 3, method 74 includes steps 76-90, and initially involves generating or otherwise identifying the perimeter(s) of each layer of 3D part 10 (step 76). For example, host computer 72 may received a digital model corresponding to 3D pat 10, slice the digital model, generate the interconnected hollow pattern in the interior region(s) of the perimeter(s) (step 78), using host computer 72 by slicing a 3D model to into section 0 to section N, which define the first and last slice. Layers N1, N2, N3 . . . Nm are then sliced to determine the number of layers per section and to identify large sparse interior regions to be filled with the interconnected cell structure. Host computer 72 may then generate tool paths (or other suitable system instructions) (step 80), and transmit the resulting data to system 34 and/or controller 68 (step 82). System 34 may then perform steps 84-90 of method 74 based on the received data.

For example, system 34 may initially print cell layers 18a having a first pattern onto platen 52, build substrate 64, and/or an underlying support structure (step 84). After the cell layer 18*a* is printed with a first pattern of open cells, a second layer 18*b* is printed on the first layer 18*a* (step 84), where the second layer has a second pattern that complements the first pattern to provide porosity, permeability and wetting surface area.

The host computer 72 determines whether the last cell layer, layer N, has been printed (step 86). If layer N has not been printed, system 34 may then rotate the printing orientation in the x-y build plane (i.e., 60 degrees about an axis extending normal from the print plane) (step 88), and then print section 18*a* with the first pattern in at a different rotational angle than the prior printed section 18*a* (step 84) followed by the section 18*b* at the different rotational angle. While an interconnected structure with two different patterns for the sections 18*a* and 18*b* is discussed, the internal structure could have one layer that is reoriented for each set of printed sections or the interconnected internal structure could have three or more repeating patterns, that are angularly reoriented as a set after the prior set of patterns is printed.

Eventually section N is printed (step 86). Therefore, system 34 may then complete any additional printing of 3D part 10 (e.g., printing a top surface, if desired) (step 90). The resulting 3D part 10 may then be removed from system 34 undergo post-processing, if desired.

Figure 4:
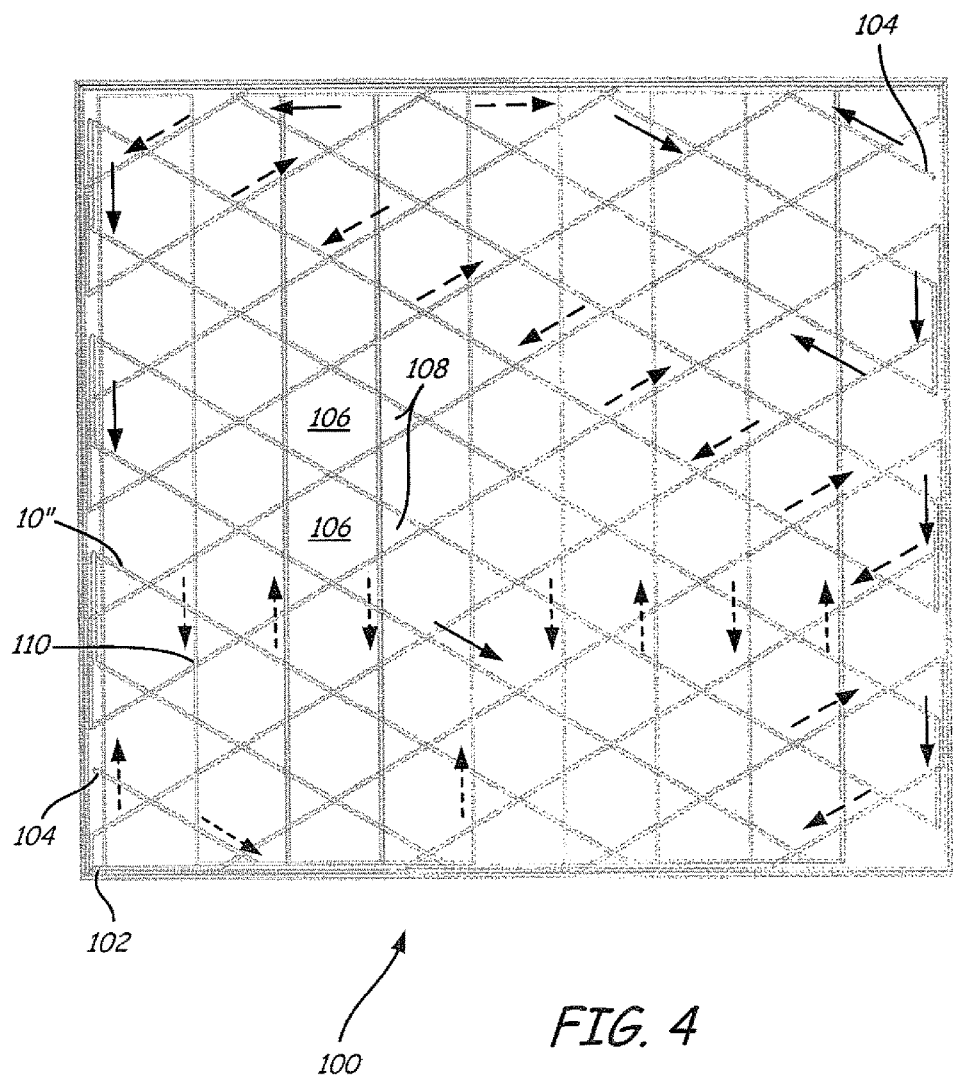
FIG. 4. is a top view of a layer having hexagram shaped cells.
Figure 5:
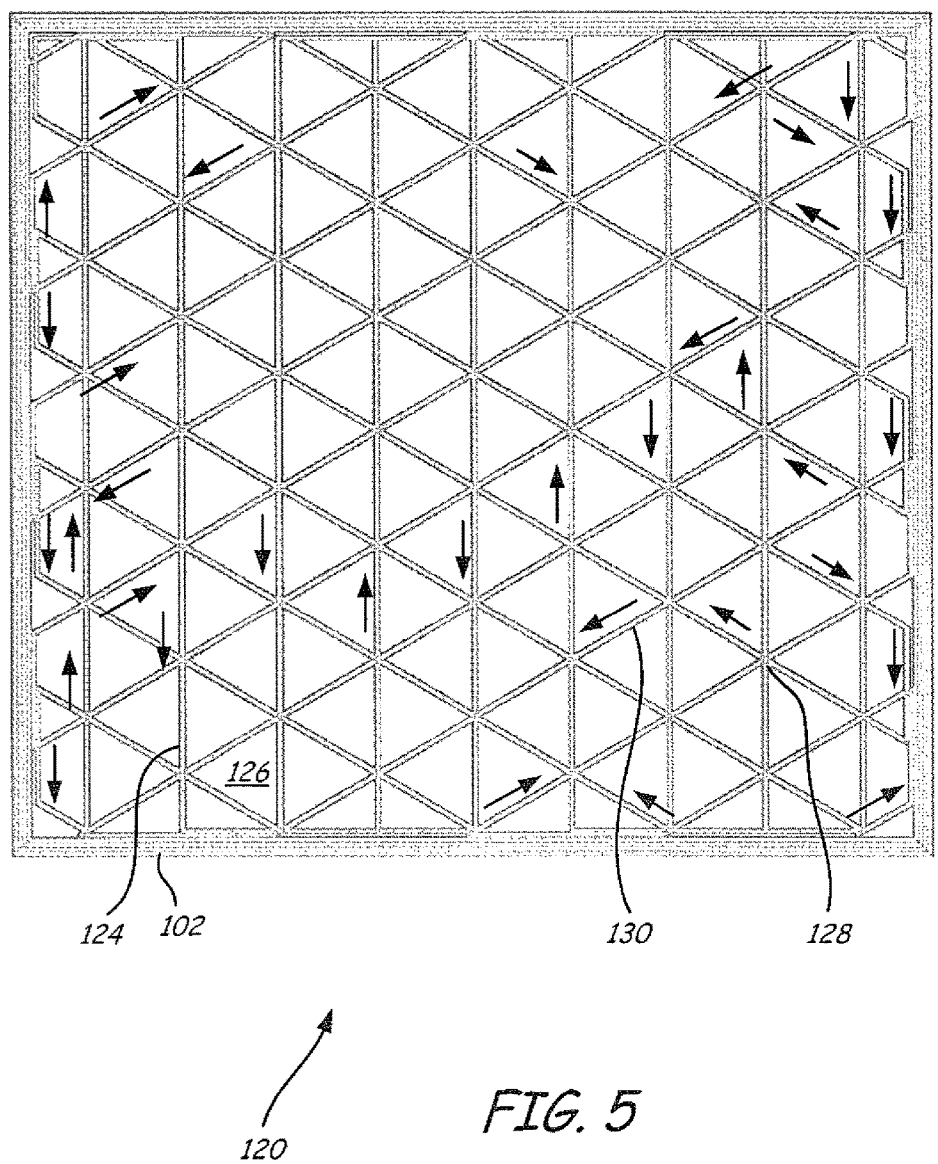
FIG. 5 is a top view of a layer having triangle shaped cells.

Referring to FIGS. 4 and 5, complementary patterns of hexagrams and equilateral triangles are illustrated. Advantageously, the triangle and hexagram patterns have a plurality of spaced substantially straight lines that are periodic in the x-y plane that are parameterized such that the layers can be built quickly on an fused deposition modeling machine. The disclosed patterns do have sharp turns in the toolpaths, which can cause the print speed to slow.

As shown in FIG. 4, 3D part 10 may include a hexagram cell section 100 that includes an outer wall 102 with internal hexagram cells. The hexagram cells are formed by walls 104 that define hexagon hollow regions 106 and triangular hollow regions 1108, where adjacent hexagon regions 106 share triangular hollow regions 108. The disclosed hexagram cells are formed utilizing toolpaths that are substantially straight, long such that the cells can be printed at a rapid rate. A proposed toolpath is indicated with differently configured arrows to illustrate the separate components of the toolpath have long straight paths, which decreases the printing time of the layers 100 of the part 10.

Referring to FIG. 5, the part 10 may include a triangle cell section 120 that includes the outer wall 102 with internal triangular cells. The triangular cells are formed by walls 124 that define a triangular hollow region 126. The size of the triangular cell is complementary to that of the hexagram cell, in that when a point 128 of the triangle aligns with a point 110 of the triangular hollow region 108 in the layer 100, a back segment 130 bisects the hexagon region 106. As illustrated by the arrows that follow the toolpath for the layer 120, the toolpath have long straight paths, which decreases the printing time of the layers 120 of the part 10.

Figure 6:
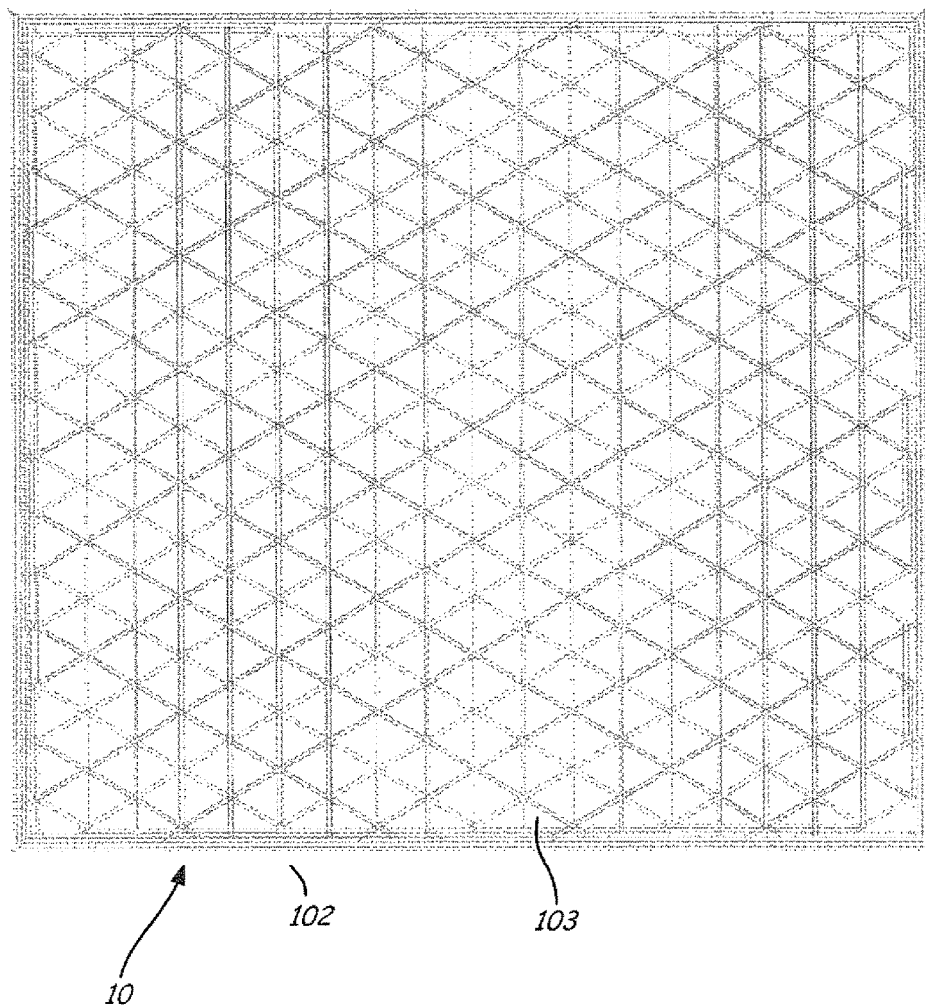
FIG. 6 is a top view of a part having layers with triangle shaped cells overlaid on layers with hexagram shaped cells.

FIG. 6 is a top view of the part 10 being built with the complementary hexagram cell sections 100 and triangle cell sections 120. The combination of the complementary hexagram sections 100 and the triangle sections 120 produces a uniform triangular pattern across the internal area 103 of the part 10, which has high porosity, permeability and wetting surface area for fast removal in an aqueous bath while having sufficient strength and stiffness to withstand at least curing process for a composite part.

Further, when the sections are rotated, as discussed above, the part has substantially the same strength in all directions. Therefore, a part printed with the combination of the sections 100 and 120 can withstand the forces required to cure a composite part, or otherwise stated the part can withstand a triaxial compression test.

In contrast, some cellular configurations can withstand forces in one direction and not in another direction. The other cellular configurations can withstand a unidirectional compression test in one direction, but may fail the unidirectional compression test in another direction.

Figure 7:
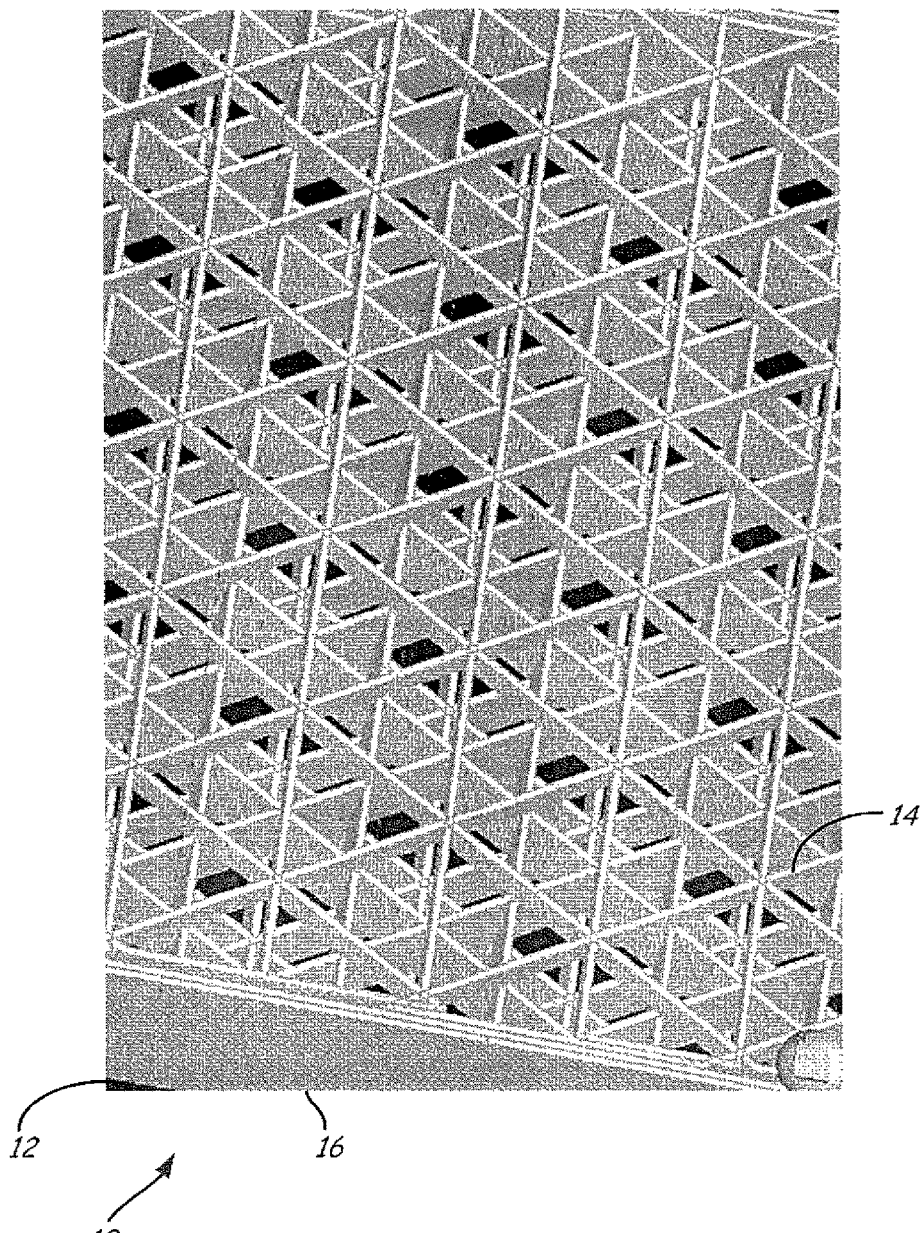
FIG. 7 is an isometric view of a 3D part of the present disclosure having an interconnected hollow pattern triangle and hexagram shaped geometries in alternating layers having 16 printed layers.
Figure 8:
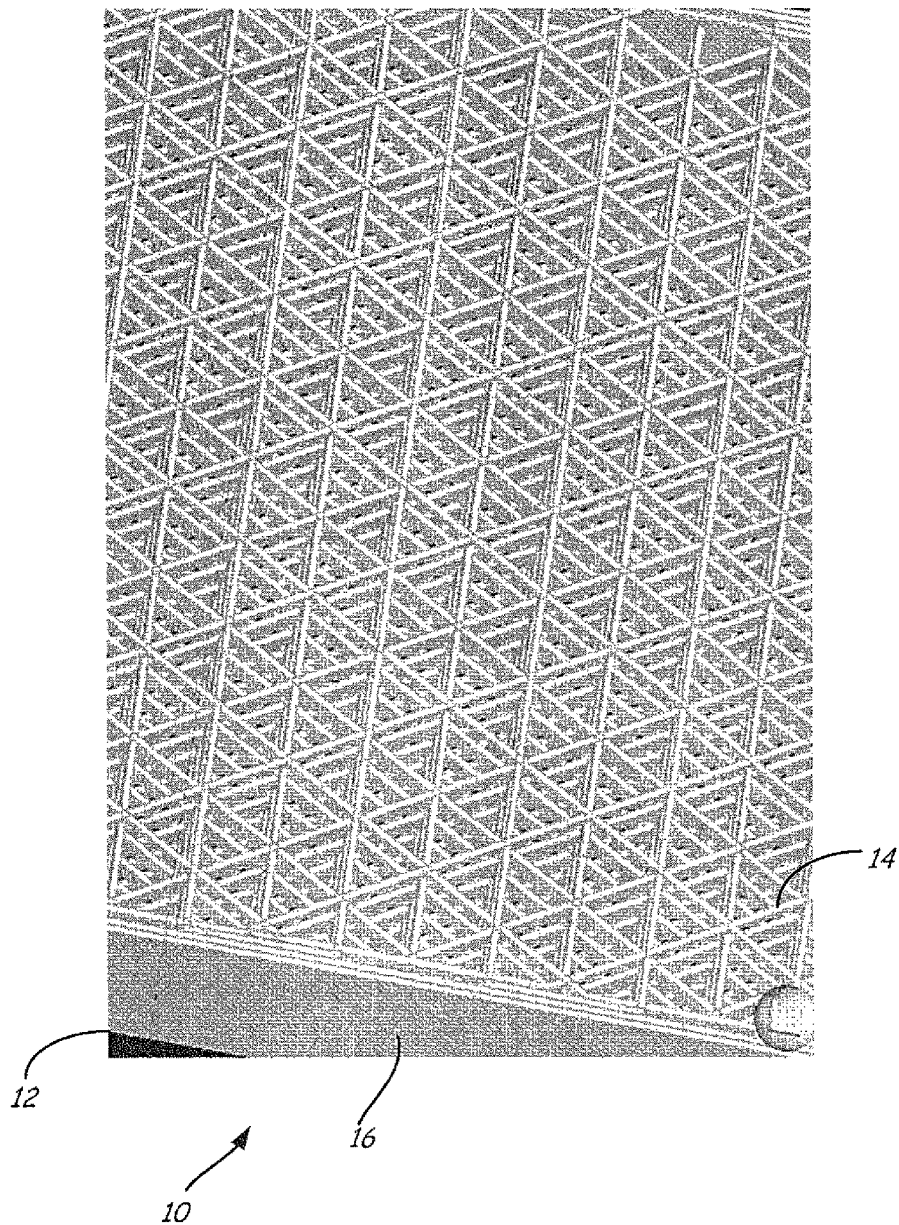
FIG. 8 is an isometric view of a 3D part of the present disclosure having an interconnected hollow pattern triangle and hexagram shaped geometries in alternating layers having 8 printed layers.
Figure 9:
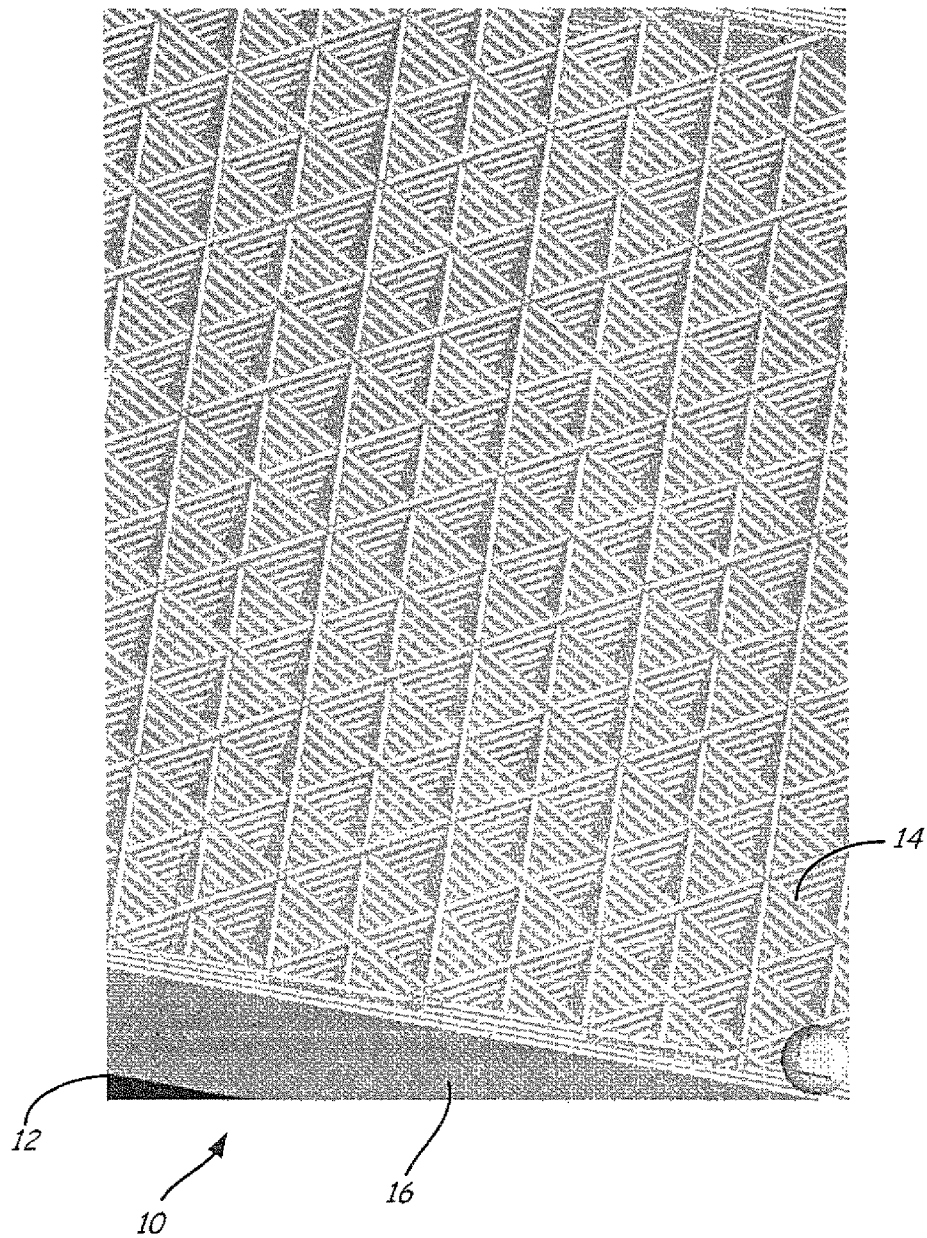
FIG. 9 is an isometric view of a 3D part of the present disclosure having an interconnected hollow pattern triangle and hexagram shaped geometries in alternating layers having 4 printed layers.

Referring to FIGS. 1 and 7-9, the number of printed layers per section are varied. FIG. 1 illustrates a portion of a part 10 where the interior is constructed of the triangle and hexagram patterns wherein each section has thirty two printed layers. FIG. 7 illustrates a portion of a part 10 where the interior is constructed of the triangle and hexagram patterns wherein each layer has sixteen printed layers. FIG. 8 illustrates a portion of a part 10 where the interior is constructed of the triangle and hexagram patterns wherein each section has eight printed layers. FIG. 9 illustrates a portion of a part 10 where the interior is constructed of the triangle and hexagram patterns wherein each section has four printed layers.

FIGS. 1 and 7-9 illustrate the balance that is required between porosity, permeability, wetted surface area, strength and stiffness. As illustrated if FIG. 1, the interior region has less material per volume that defines the cells. Therefore, the porosity and permeability are greater and the strength and stiffness are lesser relative to the patterns illustrated in FIGS. 7-9. In contrast, FIG. 9 illustrates an interior region where the strength and stiffness are greater while porosity and permeability are lessened. The physical characteristics of the embodiments illustrated in FIGS. 7 and 8 fall between those as illustrated in FIGS. 1 and 9.

Typical cell sizes range from about 0.2 inches to about 0.5 inches, where a more typical range is between about 0.25 inches and about 0.4 inches. However, the present disclosure can be utilized with any sized cell that has the desired porosity, permeability, wetting surface area, strength and stiffness.

EXAMPLES

The present disclosure is more particularly described in the following examples that are intended as illustrations only, since numerous modifications and variations within the scope of the present disclosure will be apparent to those skilled in the art.

Build Time Comparison

The same racing automotive tank was printed utilizing a Fortus 900mc manufacture by Stratasys, Inc. utilizing a porous hexagonal pattern for cells that is commercially available on the Insight software sold by Stratasys Inc. in comparison to the above disclosed cell structure of the hexagram layers and the triangular sections. The same process conditions were used for all comparative examples. Cell sizes were varied between 0.25 inches and 0.4 inches. The results are in Table 1 which is below.

TABLE 1

| Cell Design | Cell Size in. | Build Time Hr/Min | Build Tim Min | Material Volume cubic inches |
|---|---|---|---|---|
| Porous hexagonal | 0.25 | 21 hr 34 min | 1294 | 34.931 |
| Porous triangular | 0.25 | 14 hr 00 min | 840 | 37.324 |
| Porous hexagonal | 0.4 | 15 hr 13 min | 913 | 26.321 |
| Porous triangular | 0.4 | 11 hr 59 min | 719 | 29.034 |

The build time comparison illustrates that the disclosed porous triangle interior cells with the alternating hexagram and triangle patterns reduced build time by about one third of the time for parts printed with 0.25 in cells and reduced print times by about 20% for 0.4 inch cells. While print times were reduced, the amount of material volume printed increased by about 10 volume percent, meaning that stronger parts were printed more quickly relative to the commercially available cell structure for open interior spaces.

Strength Testing

XY lateral strength testing was performed on square specimens of a 2"×2"×1" filled with the porous triangular fill pattern having alternating triangles and hexagram patterns that are rotated 60 degrees per set of layers as compared to the commercial available porous sparse double dense (Porous Sparse DD) print pattern and the porous hexagonal pattern, both commercially available on the Insight software sold by Stratays, Inc. The parts were printed with an average cell size of 0.25 inches using the same material and process conditions utilizing a Fortus 900mc also manufactured by Stratasys, Inc. Two tests were run on each sample where the direction of the force was varied by 45 degrees. The results are in Table 2 which is below.

TABLE 2

| Cell Design | Force at 0 degrees(psi) | Force at 45 degrees (psi) |
|---|---|---|
| Porous Sparse DD | 592 | 302 |
| Porous Hexagonal | 496 | 364 |
| Porous Triangular | 544 | 439 |

The results of the strength test indicate that the triangular based sections with alternating triangle and hexagram layers that are rotated in sets of sections do not have inherent axes of symmetry while having stiffer structures, meaning these structures a capable of withstanding triaxial compression testing. In contrast the other structures may have unidirectional compression testing but may not be able to withstand triaxial compression testing.

Porosity and Wetting Surface Analysis

The data for the permeable triangle pattern having alternating hexagram sections and triangle layers was calculated assuming a 0.013 inch slice height and road or bead width of 0.026 inches. Calculations were performed with nominal cell sizes of 0.4 inches, 0.3 inches and 0.25 inches. Data regarding volume of the printed material, total volume, percent porosity, sparse region toolpath length and wetting surface are found in Table 3, below.

TABLE 3

| Cell Size (in.) | Part Volume (cubic in.) | Volume (cubic in.) | Porosity (%) | Sparse Region Toolpath Length (in.) | Wetting Surface Area (sq. in.) |
|---|---|---|---|---|---|
| 0.4 | 2.259 | 8 | 71.76 | 4794.06 | 155.81 |
| 0.3 | 2.732 | 8 | 65.85 | 6010.47 | 195.34 |
| 0.25 | 3.06 | 8 | 61.75 | 6853.21 | 222.73 |

Table 3 illustrates that as cell size decreases, the percent porosity decreases while part volume, the sparse region tool path length and wetting surface areas increase. Conversely as cell size increases, the part volume decreases along with the sparse region tool path and the wetting surface area while porosity increases.

Typically porosity percentages range from about 55% to about 80%, and more particularly between about 60% and about 75%. More particularly, the percent porosity ranges from about 61% to about 72%.

Typical sparse region toolpath length for a part volume of 8 cubic inches ranges from about 4200 cubic inches to about 7500 cubic inches and more particularly from about 4400 cubic inches to about 7300 cubic inches for a part volume of 8 cubic inches. More particularly, the sparse region toolpath length for a part volume of 8 cubic inches ranges from about 4500 inches to about 7000 inches.

Typical wetting surface area for an eight cubic inch part ranges from about 100 square inches to about 275 square inches and more particularly from about 125 square inches to about 250 square inches. Even more particularly, typical wetting surface are for an eight cubic inch part ranges from about 150 square inches to about 225 square inches.

Although the present disclosure has been described with reference to preferred embodiments, workers skilled in the art will recognize that changes may be made in form and detail without departing from the spirit and scope of the disclosure.

The invention claimed is:

1. A three-dimensional part printed using an additive manufacturing technique, the three-dimensional part comprising:
    an outer wall having an outer surface defining a shape of a part and in interior surface defining an interior cavity
    a plurality of first sections comprising a series of first printed layers, each first printed layer having a plurality of wall segments that form triangle shaped cells wherein each of the series of first printed sections are attached to the interior surface of the outer wall; and
    a plurality of second sections comprising a series of second printed layers, each second printed layer having a plurality of wall segments that form hexagram shaped cells of hexagons and triangles, wherein each of the series of second sections are attached to the interior surface of the outer wall and wherein the first and second sections are in an alternating pattern and wherein when adjacent first and second printed layers of the first and second sections are printed, a wall segment of a cell defining a triangle bisect the hexagon shaped cell.

2. The three-dimensional part of claim 1, wherein adjacent pairs of first and second sections form a set and wherein a next set of the first and second sections is angularly rotated from the previously printed set of first and second sections.

3. The three-dimensional part of claim 2, wherein the next set of first and second sections is angularly rotated about 50 degrees to about 70 degrees relative to the previously printed set of layers.

4. The three-dimensional part of claim 2, wherein the next set of first and second sections is angularly rotated about 60 degrees relative to the previously printed set of layers.

5. The three-dimensional part of claim 1, wherein an average cell size for both the plurality of first and second sections is in the range of about 0.2 inches to about 0.5 inches.

6. The three-dimensional part of claim 1, wherein an average cell size for both the plurality of first and second sections is in the range of about 0.25 inches to about 0.4 inches.

7. The three dimensional part of claim 1, wherein first and second plurality of sections result in a part with no inherent axes of symmetry.

8. A method of additive manufacturing a sacrificial tooling part having an interconnected hollow triangular fill pattern, the method comprising:
   printing a outer wall portion having an outer surface and an inner surface;
   printing a first section comprising a plurality of triangular shaped cell layers, wherein the triangle cells are formed by segments, wherein each segment extends in a substantially straight line between two points on the inner surface; and
   printing a second section comprising a plurality of hexagram shaped cell layers over the first section of triangular shaped cell layers, wherein the hexagram cells comprise hexagon cells that have common triangle cells,
   wherein the hexagram cells are formed by segments, wherein each segment extends in a substantially straight line between two points on the inner surface wherein when the first and second set of cell sections are printed the triangle cells interconnect with the hexagram cells.

9. The method of claim 8, wherein when the second set of the hexagram sections are printed over the first section of triangle layers, a side of the triangle cells bisects the hexagon cell.

10. The method of claim 8, wherein the first and second sections are a set and wherein a next set of first and second sections is printed at an angle rotated to the printed set of first and second sections.

11. The method of claim 10, wherein the next set of first and second sections are printed at an angle between about 50 degrees and about 70 degrees relative to the previously printed set of sections.

12. The method of claim 10, wherein the next set of first and second sections are printed at an angle of about 60 degrees relative to the previously printed set of sections.

13. The method of claim 8, wherein an average cell size for both the plurality of first and second sections is in the range of about 0.2 inches to about 0.5 inches.

14. The method of claim 8, wherein an average cell size for both the plurality of first and second layers is in the range of about 0.25 inches to about 0.4 inches.

15. The method of claim 8, wherein the first and second sections each comprise one or more intermediate segments that is printed to the wall and connected ends of two adjacent substantially straight segments.

16. A method of manufacturing a sacrificial tooling part in a layer by layer manner utilizing an additive manufacturing device, the sacrificial tooling part configured for use in making a composite part, the method comprising:
   printing layers of an outer wall portion having an outer surface and an inner surface using an additive manufacturing technique with a water soluble or disintegrable material, wherein the outer wall surface defines a shape of the desired composite part;
   printing a first section comprising a plurality of triangular shaped cell layers using the additive manufacturing technique with a water soluble or disintegrable material, wherein the triangle cells are formed by segments, wherein each segment extends in a substantially straight line between two points on the inner surface; and
   printing a second section comprising a plurality of hexagram shaped cell layers over the first section of triangular shaped cell layers using the additive manufacturing technique with a water soluble or disintegrable material, wherein the hexagram cells comprise hexagon cells that have common triangle cells, wherein the hexagram cells are formed by segments, wherein each segment extends in a substantially straight line between two points on the inner surface wherein when the first and second set of cell sections are printed the triangle cells interconnect with the hexagram cells; and
   repeating the printing of the first and second cell sections within the outer wall portion until the sacrificial tooling part is built where the next printed sections are rotated an angle relative to the previously printed layers.

17. The method of claim 16 and further comprising:
   placing one or more layers of composite material over the outer surface of the outer wall portion after the part is built;
   curing the composite material at elevated temperatures and pressures to produce the composite part; and
   submerging the cured composite part in an aqueous solution to remove the part therefrom.

18. The method of claim 17 and wherein the sacrificial tooling part will sustain its shape at elevated temperatures in the range of 230° F. to about 250° F.

19. The method of claim 17 and wherein the where the sacrificial tooling part will sustain its shape at elevated pressure of up to about 100 psig.

20. The method of claim 16, wherein when the second set of the hexagram sections are printed over the first set of triangle sections, a side of the triangle cells bisects the hexagon cell.

21. The method of claim 16, wherein the next set of first and second layers are printed at an angle between about 50 degrees and about 70 degrees relative to the previously printed layers.

22. The method of claim 21, wherein the next set of first and second sections are printed at an angle of about 60 degrees relative to the previously printed set of sections.

23. The method of claim 16, wherein an average cell size for both the plurality of first and second sections in the range of about 0.2 inches to about 0.5 inches.

24. The method of claim 16, wherein an average cell size for both the plurality of first and second sections in the range of about 0.25 inches to about 0.4 inches.

25. The method of claim 16, wherein the first and second sections each comprise one or more intermediate segments that is printed to the wall and connected ends of two adjacent substantially straight segments.

* * * * *